United States Patent [19]
Rickards

[11] 4,083,425
[45] Apr. 11, 1978

[54] PASSIVE STERN SEAL FOR AIR CUSHION VEHICLE

[75] Inventor: Michael A. Rickards, La Jolla, Calif.

[73] Assignee: Rohr Industries, Incorporated, Chula Vista, Calif.

[21] Appl. No.: 777,884

[22] Filed: Mar. 16, 1977

[51] Int. Cl.² .............................................. B60V 1/16
[52] U.S. Cl. ..................................... 180/127; 180/126
[58] Field of Search ............... 180/127, 126, 128, 116, 180/117, 118, 119; 114/67 R, 67 A

[56] References Cited

U.S. PATENT DOCUMENTS

| 3,191,705 | 6/1965 | Jones | 180/126 |
|---|---|---|---|
| 3,204,715 | 9/1965 | Maloof | 180/126 |
| 3,249,166 | 5/1966 | Cockerell | 180/128 |
| 3,258,080 | 6/1966 | Williams | 180/127 |
| 3,387,685 | 6/1968 | Fresh | 180/119 |
| 3,416,627 | 12/1968 | Francis | 180/127 |
| 3,473,503 | 10/1969 | Gunther | 180/126 X |
| 3,532,180 | 10/1970 | Ford | 180/126 |
| 3,608,664 | 9/1971 | Taylor | 180/127 |
| 3,866,707 | 2/1975 | Paoli | 180/127 |
| 4,046,217 | 9/1977 | Magnuson | 180/126 |

FOREIGN PATENT DOCUMENTS 781,806 4/1968 United Kingdom ................ 180/128

Primary Examiner—Kenneth H. Betts
Attorney, Agent, or Firm—Patrick J. Schlesinger; Frank D. Gilliam

[57] ABSTRACT

A passive stern seal for a plenum chamber of an air cushion marine vehicle comprising a front rectilinear planar seal member with an upward extending curvilinear rear tip, a plurality of front seal member supporting stay members adjacent to the underside of the planar seal, and pivotally attached to the vehicle at their forward surfaces, strut members pivotally attached and extending from the front planar seal member adjacent the curvilinear tip; a rear seal member extending from an attachment to the vehicle downward and to an attachment to the front planar seal member forward of the curvilinear tip, the free end of the strut members are attached to the upper surface of the rear seal member and a plurality of forming members are attached between the rear seal member and the vehicle. The forming members cooperate with pressure within the stern seal and form at least one transverse convolute in said rear seal member. Apertures are provided through the rear seal adjacent the strut attachment point to provide drainage for any water trapped within the stern seal.

11 Claims, 5 Drawing Figures

PASSIVE STERN SEAL FOR AIR CUSHION VEHICLE

BACKGROUND OF THE INVENTION

This invention herein described was made in the course of or under a contract or subcontract thereunder with the Department of the Navy.

The invention relates generally to seals for air cushion vehicles and more specifically to a stern seal for a plenum chamber of a surface effect ship.

Various seals for plenum-chambers have hereinbefore been known that provide a degree of success but have not been found to be entirely satisfactory. Some of these prior seals are taught in U.S. Pat. Nos. 3,870,121, 3,416,627, 3,387,685, 3,244,244 and 3,258,080. In general, these devices have an elastomeric interface with the water surface, seal pressure must be greater than the cushion pressure for stability and the recovery force at high immersions would require a pressure ratio greater than 1.

SUMMARY OF THE INVENTION

The instant invention provides an improved stern seal for a marine air cushion vehicle that is operable to provide an adequate seal under various water surface conditons, improve stability of the vehicle which is simple and has improved reliability.

The principle object of the invention is to provide adequate stern seal recovery forces on the forward sealing member by means of pressure from the cushion itself.

A further object of the invention is to provide recovery forces for the stern seal even when the stern seal plenum to cushion pressure ratio is less than 1.

A further object of the invention is to provide attenuated near constant recovery forces when the stern seal displacement is greatest.

Other advantages of this invention will become more apparent when taken in conjunction with the drawings which:

DESCRIPTION OF THE PREFERRED EMBODIMENT

The same referenced numerals are used throughout the specification and drawings to depict the same part or element.

Figure 1:
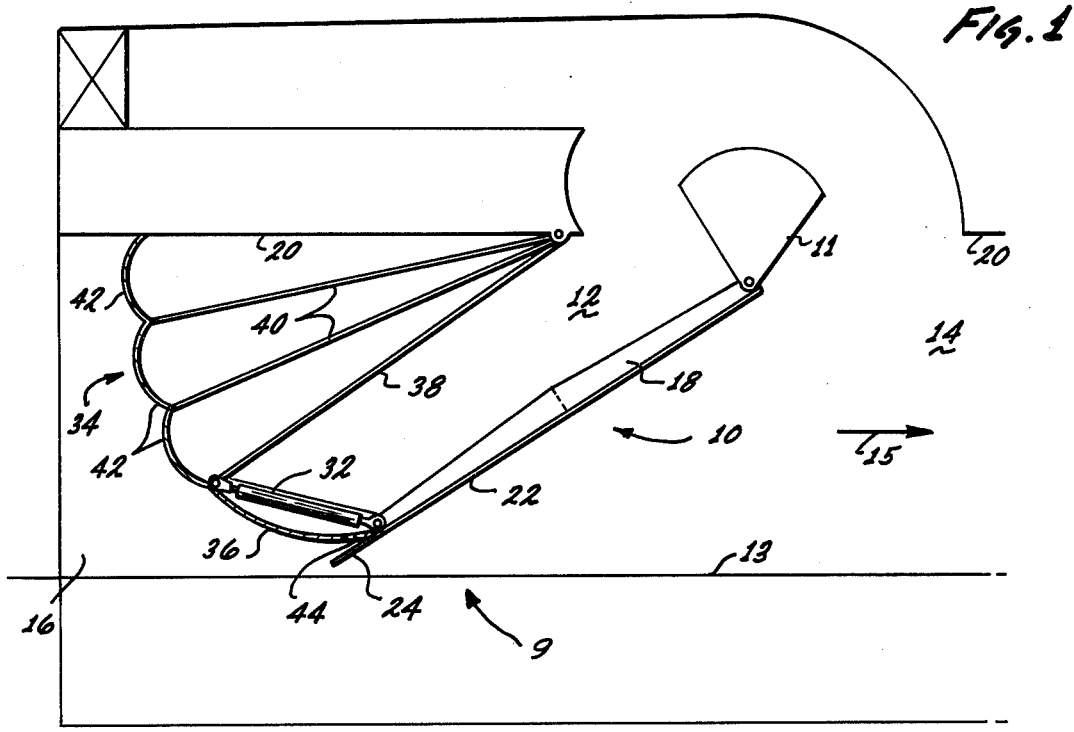
FIG. 1 is a diagrammatic side view showing of the stern seal of the instant invention including a plurality of convolutes with the foreground sidewall or hull removed.

Referring now to FIG. 1, there is shown a stern section of a surface effect vehicle 9, a stern seal 10, having a stern plenum chamber 12, for receiving cushion pressure from the central plenum chamber 14 (rear portion shown) forward of the stern seal area (in the direction of arrow 15). A port and starboard sidewall or sidehull 16 is shown extending behind the stern seal and partially submerged below water surface 13. These sidewalls/sidehulls 16 seal the transverse edges of the stern seal 10.

Figure 2:
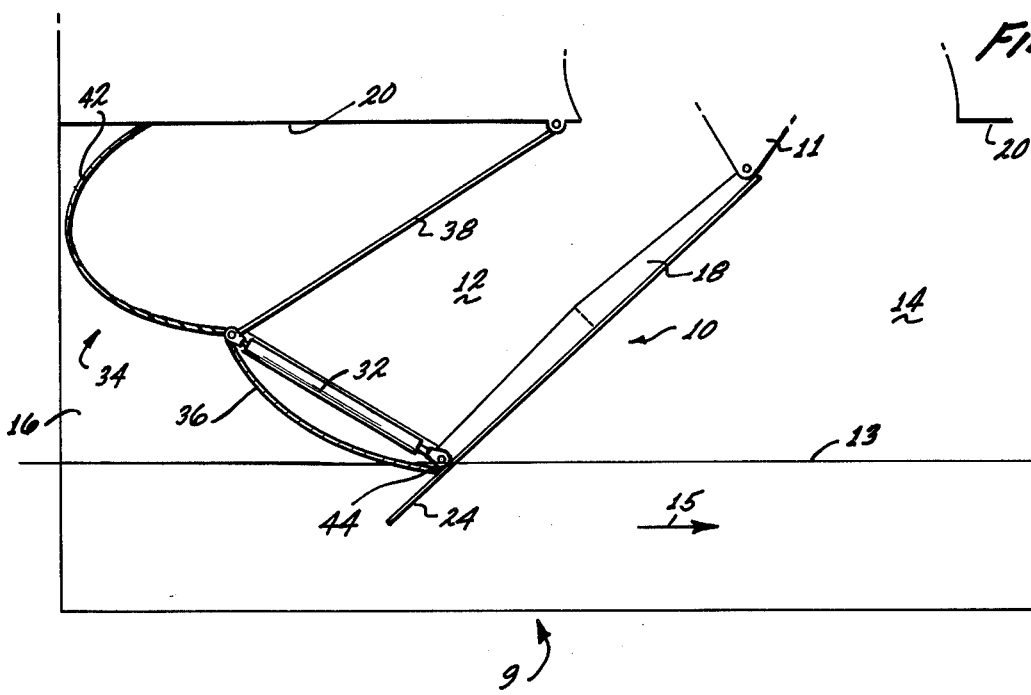
FIG. 2 is a diagrammatic side view showing of the stern seal of the instant invention showing a single convolute.
Figure 3:
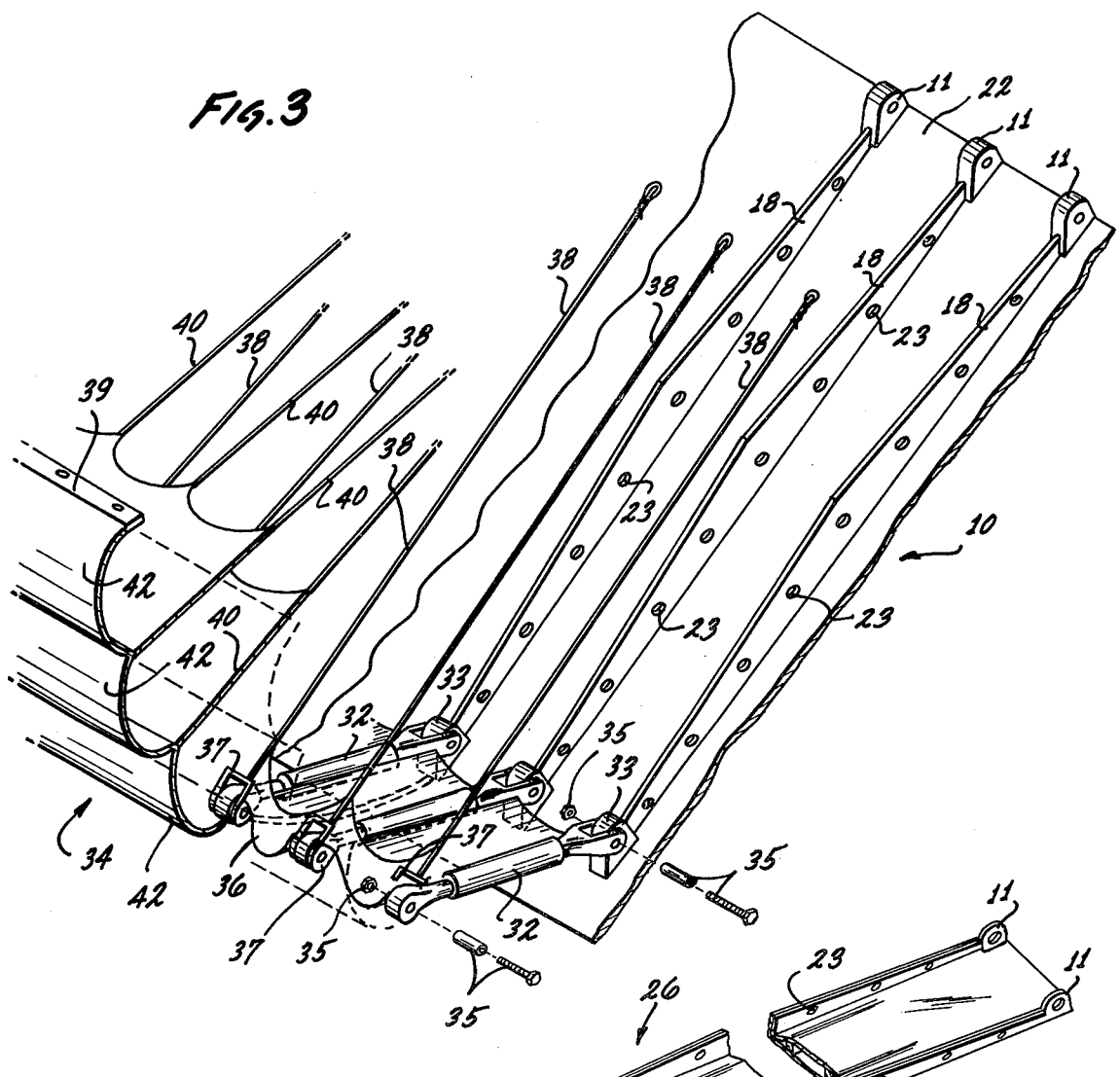
FIG. 3 is a cutaway perspective showing a portion of the stern seal.

Referring now to FIGS. 1, 2 and 3, a plurality of side by side spaced apart stay members 18 are pivotly connected to the wet deck 20 of the vehicle 9 through a bushing 11. These stay members provide support to a rectilinear forward seal membrane 22. The forward seal membrane 22 separates the inner plenum chamber 12 of the stern seal structures 10 from the forward or main plenum chamber 14 leaving a smooth outside planning surface which reduces the stern seals overall drag. The stay members 18 are formed of light weight rigid material, such as fiberglass, aluminum or material having the same or similar characteristics. Lightening holes 23 may be used in their construction for further weight reduction. The stay members 18 are characteristically flat and, in some instances, may have an upward extending curvilinear rear tip 24.

The forward seal membrane 22 may be formed of any semi-rigid material that when combined with the stay members provide a substantially planer surface. Such material as fiberglass, thin metal or the like, may be employed for this purpose. The forward seal membrane 22 may or may not be fixedly attached to the stay members 18.

Figure 4:
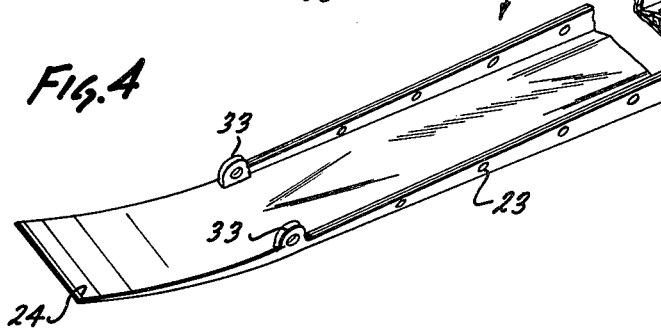
FIG. 4 is a perspective view of a segment of a segmented combined stay and front seal member and an end view of their method of joining.
Figure 5:
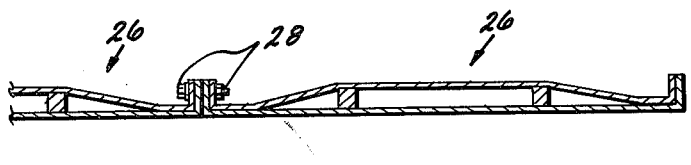
FIG. 5 is an end view of plurality joined stays.

The stay members 18 and the forward seal membrane 22 may be formed together as individual sections from the same material as shown in FIGS. 4 and 5. When constructed in this manner, damaged sections of the stay members and forward seal members 26 can be replaced rather than replacing the entire forward seal membrane 22. FIG. 5 shows the manner in which the individual stay and forward seal membrane sections 26 are attached together by attachment means (such as, but not limited to, nut and bolt combinations 28,) through a selected number of lightening holes 23, as well as, a typical example of their cross-sectional construction which provides increased strength. The stay membrane may also be tied side by side in the manner shown in FIGS. 4 and 5 by means of elastomeric structures that allow a folding action maximum lateral bending dexterity for operation at quatering seas.

Positioned adjacent the rearmost surface of the forward seal membrane 22, at substantially the rearmost surface of the stays, are a plurality of side by side rigid strut members 32. Each of the strut members are pivotly attached at bushing 33 to one of the stay members 18. The stay and strut members must be capable to taking bending loads, tension or compressive loads due to the pressure differential from the stern plenum chamber 12 to the atmosphere. These strut members are essential for effecting a recovery force and represent a major feature of the instant invention.

A flexible rear membrane 34 is sealedly attached at its lower surface 36 to the forward seal membrane 22 adjacent the strut attachment point. The other upper end of the rear seal flexible membrane 34 is secured and sealed to the wet decks 20 or lower inner surfaces of the vehicle 9 along upper surface 39.

The rear upward end of the strut members 32 are fixedly attached to the inner surface of the rear seal membrane 34 upward from its attachment at the forward seal membrane 22. Pivotly connected at flange 37 to the rear seal flexible membrane 34 end of each strut member 32 is a forming cable 38 pivotly attached to the wet deck 20 of the vessel 9 intermediate the forward seal membrane 22 and rear seal flexible membrane 34 attachment points. The strut member attachment at both ends is provided by pivot pin, bushing and nut combinations 35 or the like in a conventional manner to allow free pivoting. There are additional rows of rear seal membrane material attached to forming cables 40 of the same or different length than the forming cables 38. Each row of the rear membrane has a plurality of forming cables 40 pivotly attached to the common forming cable vehicle pivot point. The rear seal flexible membrane when pressurized forms a single lobe or convolute 42 (see FIG. 2) or a plurality of horizontal lobes or convolutes 42 that are inwardly directed at their forming cable attachment points.

OPERATION OF THE PREFERRED EMBODIMENT

The stern seal 10 of the instant invention consists of one or more lobes or convolutes 42 held in place by forming cables 38, 40. The lowermost positioned forming cables 38 are called the geometric straps, and are held substantially but not necessarily parallel with the lower surface of the stay members 18. The length between the forming cable anchor point and stay member anchor point, at the lower surface of the vehicle 9, form one side and the strut members form one side of opposite parallel sides of a parallelogram with the lower forming cable 38 and the stay members 18 forming the other opposite parallel sides. The strut is the key component to the substantially normally parallelogram configured system of the inventions. The two pair of opposite parallel sides that normally make up the four bar linkage may be totally or partially of unequal length for some applications. These various possible different configurations may form substantially a trapezoid. As the forward seal membrane is biased upward in heave, a force is applied against the underside of the forward seal membrane, raising the rear of the stay members and forward seal membrane upward, causing the strut members 32 to have compressive forces between their ends, all of the forming cables 38, 40 are in tension as well as the stay members 18. The pressure differential on the strut members 32 (difference between the gage pressure in the stern plenum chamber and atmospheric pressure) is the driving force that provides the stern seal recovery forces. These recovery forces are transmitted along the vehicle beam to the strut by means of the lobes or convolutes 42. The parallelogram or trapezoid formed by the lower forming cables 38, the stay member 18, the strut members 32 and the distance between the lower forming cables 38 and stay member vehicle anchors provides a near optimum shape and allows for the best articulation.

Variations in the length of strut may be utilized where it is desirable to have the restoring force vs. heave height to change in shape.

Openings 44 to the exterior of the plenum chamber 12 are provided at the strut members and the forward planar seal member joiner to provide drainage holes for any water collected in the rear plenum chamber 12.

Variations and modifications may be made within the scope of the invention, and portions of the improvements may be used without each other.

I claim:

1. A passive stern seal for an air cushion marine vehicle for transversing the surface of water comprising:
   a front seal member;
   a plurality of support stays attached to the inner surface of said front seal member, the forward end of said stay being pivotly attached to said vehicle;
   a plurality of strut members each one of said plurality of strut members being pivotly attached at one end to one of said plurality of stay members;
   a rear seal member attached at one end to said front seal member adjacent the strut stay attachment point and to said vehicle at its other end, the other end of said strut member being attached to said rear seal member intermediate its ends; and
   a plurality of first strap members pivotly attached to the rear seal member at its end attached to said strut members and to said vehicle at a position adjacent said strut members.

2. The invention as defined in claim 1, additionally comprising a plurality of second strap members attached between said rear seal member and said vehicle.

3. The invention as defined in claim 1, wherein said front seal member is generally rectilinear with an upward curvilinear formed rear most surface.

4. The invention as defined in claim 1, wherein said support stays are substantially rigid.

5. The invention as defined in claim 1, wherein said support stays are free to move with respect to each other.

6. The invention as defined in claim 1, wherein said rear seal member is resilient and comprises at least one horizontal extending convolute formed by said strap members and the air cushion.

7. The invention as defined in claim 1, wherein the length of said stays between their vehicle attached end and said strut attachment point are substantially equal to the length of said first strap members.

8. The invention as defined in claim 1, wherein the length of said stays between their vehicle attached end and said strut attachment point is of a different length than said first strap members.

9. The invention as defined in claim 1, wherein the length of said stays between their vehicle attached end and said strut attachment point are substantially equal to the length of said first strap members and the distance between the strap vehicle attachment and the stay vehicle attachment and the length of the strut members are substantially equal.

10. The invention as defined in claim 1, wherein the length of said stays between their vehicle attached end and said strut attachment point and said first strap members are of different lengths and the distance between the strap vehicle attachment and the stay vehicle attachment and the strut members are of different lengths.

11. The invention as defined in claim 1, wherein said seal member positioned between said support stays is elastomeric to provide a folding action when adjacent support stays are brought together.

* * * * *